(12) United States Patent
Miyake et al.

(10) Patent No.: US 7,286,461 B2
(45) Date of Patent: Oct. 23, 2007

(54) OPTICAL DISK DRIVING APPARATUS AND METHOD, AND RECORDING MEDIUM AND PROGRAM USED THEREWITH

(75) Inventors: Kunihiko Miyake, Kanagawa (JP); Tetsuji Kawashima, Kanagawa (JP)

(73) Assignee: Sony Corporation (JP)

( * ) Notice: Subject to any disclaimer, the term of this patent is extended or adjusted under 35 U.S.C. 154(b) by 599 days.

(21) Appl. No.: 10/925,460

(22) Filed: Aug. 24, 2004

(65) Prior Publication Data

US 2005/0063269 A1 Mar. 24, 2005

(30) Foreign Application Priority Data

Aug. 25, 2003 (JP) ............................ P2003-299546

(51) Int. Cl.
*G11B 7/00* (2006.01)
(52) U.S. Cl. .................................................. 369/53.22
(58) Field of Classification Search ............. 369/53.22, 369/47.1, 47.27, 47.28
See application file for complete search history.

(56) References Cited

U.S. PATENT DOCUMENTS 6,856,586 B2 * 2/2005 Usui et al. ............... 369/47.28
2003/0123358 A1 7/2003 Kanda et al.

FOREIGN PATENT DOCUMENTS

| JP | 04259918 | 9/1992 |
|----|----------|--------|
| JP | 09161387 | 6/1997 |
| JP | 10302381 | 11/1998 |
| JP | 2000023089 | 1/2000 |
| JP | 2000149415 | 5/2000 |
| JP | 2000322742 | 11/2000 |
| JP | 2003242641 | 8/2003 |

* cited by examiner

*Primary Examiner*—Nabil Hindi
(74) *Attorney, Agent, or Firm*—Lerner, David, Littenberg, Krumholz & Mentlik, LLP

(57) ABSTRACT

An optical disk driving apparatus includes a control computer, and the optical disk driving apparatus acquires a wobble signal. The control computer calculates an average period of a binarized wobble signal and a variance of the period of the binarized wobble signal. The control computer determines whether the calculated average period satisfies the specifications of DVD-R or DVD-RW and determines whether the calculated variance is below a predetermined level.

4 Claims, 5 Drawing Sheets

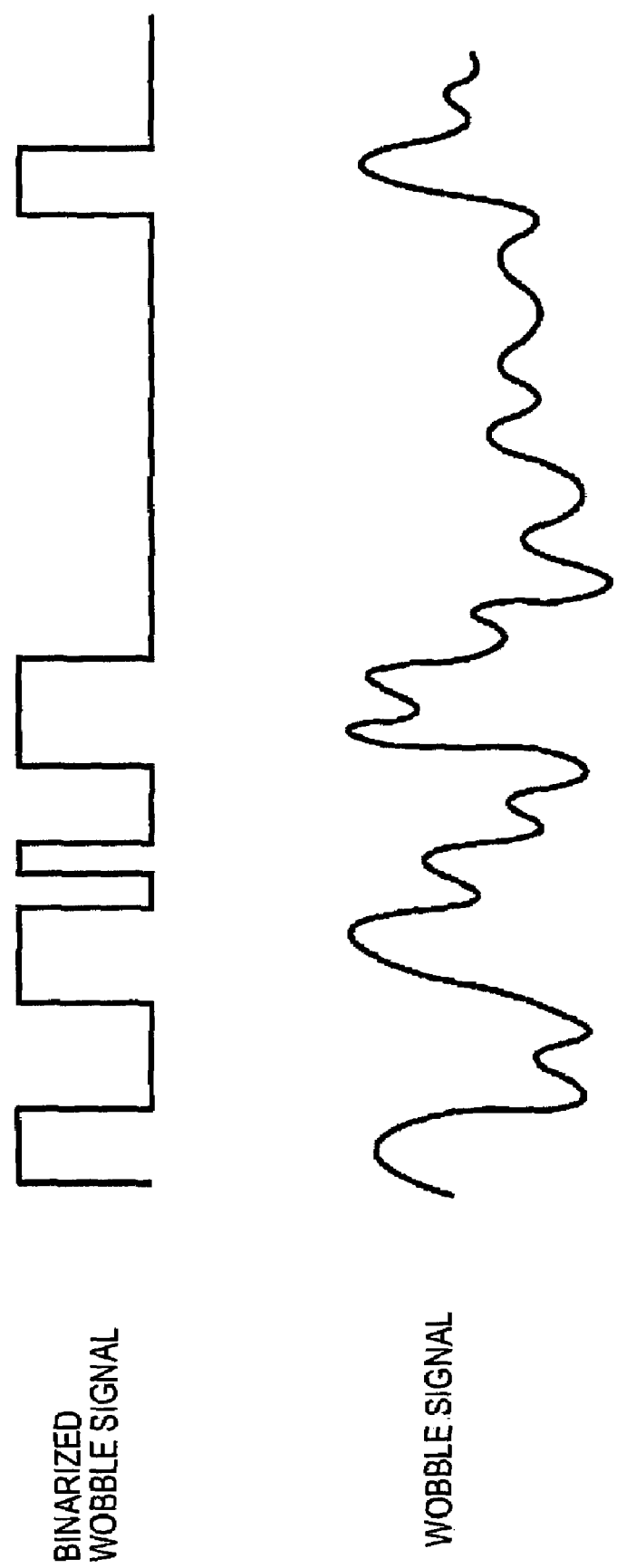

OPTICAL DISK DRIVING APPARATUS AND METHOD, AND RECORDING MEDIUM AND PROGRAM USED THEREWITH

BACKGROUND OF THE INVENTION

1. Field of the Invention

The present invention relates to optical disk driving apparatuses and methods, and recording media and programs used therewith. In particular, the present invention relates to an optical disk driving apparatus and method for identifying the format of an optical disk loaded into the optical disk driving apparatus, and to a recording medium and program used with the apparatus and method.

2. Description of the Related Art

Presently, multi-disk recorders and players capable of recording on or playing back optical disks having various types of formats have come into common use. In particular, regarding DVDs (digital versatile disks), a plurality of formats capable of recording are used, such as DVD-RAM (digital versatile disk random access memory), DVD-R (digital versatile disk recordable), DVD-RW (digital versatile disk rewritable (common name of re-recordable DVD disks)), DVD+R, and DVD+RW. Accordingly, a disk format must be properly identified for recording or playback.

For example, Japanese Unexamined Patent Application Publication No. 2003-16641 discloses a technology using an optical disk identifying means. The optical disk identifying means changes the rotational speed of a disk to that obtained under spindle control at constant linear velocity, and measures the difference in frequency between a wobble signal frequency and wobble-signal central frequency extracted under spindle control at the constant linear velocity. When the difference in frequency is less than a threshold value, the optical disk identifying means determines that the disk is recordable. When the difference in frequency is greater than the threshold value, the optical disk identifying means determines that the disk is of a playback-only type.

In addition, when a disk format is identified by comparing only the wobble signal frequency and the threshold value, the disk format may fail to be identified.

SUMMARY OF THE INVENTION

According to an aspect of the present invention, an optical disk driving apparatus for driving an optical disk is provided. The optical disk driving apparatus includes an acquiring unit for acquiring a wobble signal, a calculating unit for calculating the average period of the wobble signal and the variance of the period of the wobble signal, and a determining unit for determining, based on the calculated average period and variance of the period of the wobble signal, whether or not the optical disk is of a predetermined format.

According to another aspect of the present invention, an optical disk driving method for an optical disk driving apparatus for driving an optical disk is provided. The optical disk driving method includes an acquiring step of acquiring a wobble signal, a calculating step of calculating the average period of the wobble signal and the variance of the period of the wobble signal, and a determining step of determining, based on the calculated average period and variance of the period of the wobble signal, whether or not the optical disk is of a predetermined format.

According to another aspect of the present invention, a recording medium having a computer-readable program recorded thereon is provided. The program controls an optical disk driving apparatus for driving an optical disk, and includes an acquiring step of acquiring a wobble signal, a calculating step of calculating the average period of the wobble signal and the variance of the period of the wobble signal, and a determining step of determining, based on the calculated average period and variance of the period of the wobble signal, whether or not the optical disk is of a predetermined format.

According to another aspect of the present invention, a program for allowing a computer to perform a process of controlling an optical disk driving apparatus for driving an optical disk is provided. The program includes an acquiring step of acquiring a wobble signal, a calculating step of calculating the average period of the wobble signal and the variance of the period of the wobble signal, and a determining step of determining, based on the calculated average period and variance of the period of the wobble signal, whether or not the optical disk is of a predetermined format.

The optical disk driving apparatus may be an independent apparatus or may be a block for driving a recording/playback apparatus.

According to the present invention, a wobble signal is acquired and the average period of the wobble signal and the variance of the period of the wobble signal are calculated. Based on the calculated average period and variance of the wobble signal, it is determined whether an optical disk is of a predetermined format.

According to the present invention, it is ensured that an optical disk format can be identified without additionally providing a special optical-disk-format identifying device.

BRIEF DESCRIPTION OF THE DRAWINGS

FIG. 5 is an illustration of examples of a binarized wobble signal and a wobble signal.

DESCRIPTION OF THE PREFERRED EMBODIMENTS

Figure 1:
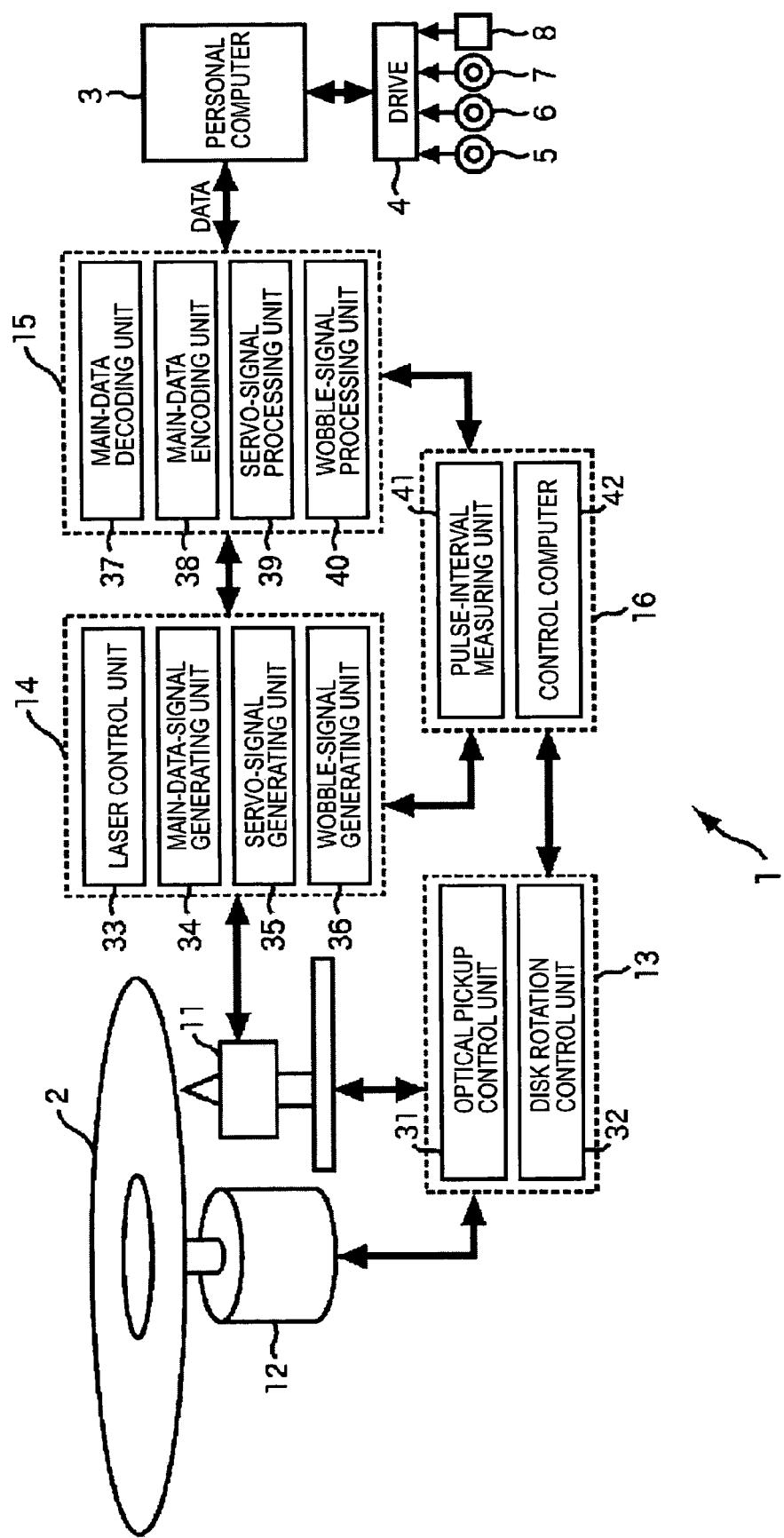
FIG. 1 is a block diagram showing an optical disk driving apparatus according to an embodiment of the present invention.

FIG. 1 is a block diagram showing an optical disk driving apparatus according to an embodiment of the present invention. An optical-disk recording/playback apparatus 1, used as an example of the optical disk driving apparatus, drives an optical disk 2 in a state loaded into the optical-disk recording/playback apparatus 1, and records data on the optical disk 2, or reads data recorded on the optical disk 2 for playback.

Although the optical-disk recording/playback apparatus 1 is described as an independent apparatus, it is not limited to the independent apparatus, but may be a portion for driving an optical disk in another type of apparatus, such as a driving unit for a personal computer.

The optical disk 2 only needs to be a recording medium on which data is recorded or read by emitting an optical beam. The optical disk 2 may be, for example, a DVD. The type of DVD may be a DVD-ROM (digital versatile disk read-only memory), a DVD-R (digital versatile disk recordable), a DVD-RW (digital versatile disk rewritable (common name of a DVD rerecordable disk)), a DVD+R, or a DVD+RW.

The optical-disk recording/playback apparatus 1 records, on the loaded optical disk 2, data supplied from a personal computer 3 used as a host, or reads data recorded on the optical disk 2 and supplies the data to the personal computer 3 (host).

The optical-disk recording/playback apparatus 1 includes an optical pickup 11, a spindle motor 12, a driving controller 13, a signal generator 14, a signal processor 15, and a main controller 16. The optical pickup 11 emits an optical beam onto the optical disk 2, which is rotated by the spindle motor 12, detects the intensity of light reflected by the optical disk 2, and generates a signal corresponding to the detected intensity. The optical pickup 11 supplies the generated signal to the driving controller 13 and the signal generator 14.

Driving of the spindle motor 12 is controlled by the driving controller 13, and the spindle motor 12 rotates the optical disk 2, which is mounted on a spindle. The driving controller 13 controls driving of the optical pickup 11 and the driving of the spindle motor 12.

The signal generator 14 generates various signals based on the signal supplied from the optical pickup 11 or a signal supplied from the signal processor 15.

For example, the signal generator 14 generates a control signal based on the signal supplied from the optical pickup 11, and supplies the control signal to the main controller 16. When data is read from the optical disk 2, the signal generator 14 generates a demodulation signal based on the signal supplied from the optical pickup 11, and supplies the demodulation signal to the signal processor 15. When data is written in the optical disk 2, the signal generator 14 generates a writing signal for writing data to the optical disk 2, and supplies the writing signal to the optical pickup 11.

The signal processor 15 processes the signal supplied from the signal generator 14, or processes the signal supplied from the personal computer 3. For example, when data is read from the optical disk 2, the signal processor 15 processes the signal supplied from the signal generator 14 and supplies the personal computer 3 with data obtained by the processing. When data is written in the optical disk 2, the signal processor 15 processes the signal supplied from the personal computer 3 and supplies the processed signal to the signal generator 14.

The main controller 16 controls the entirety of the optical-disk recording/playback apparatus 1. For example, based on the signal supplied from the signal generator 14 or the signal supplied for the signal processor 15, by supplying various control signals to the driving controller 13, the main controller 16 instructs the driving controller 13 to control the driving of the optical pickup 11 or the spindle motor 12. The main controller 16 controls the signal generation of the signal generator 14 by supplying various signals to the signal generator 14. The main controller 16 also controls the signal processing of the signal processor 15 by supplying various signals to the signal processor 15.

More specifically, the driving controller 13 includes an optical pickup control unit 31 and a disk rotation control unit 32. The optical pickup control unit 31 controls the driving the optical pickup 11 based on the signals.(e.g., a servo-error signal, etc.) supplied from the optical pickup 11 and the control signal supplied from the main controller 16. The disk rotation control unit 32 controls the driving the spindle motor 12 to control the rotation of the optical disk 2, which is rotated by the spindle motor 12, based on the signal (e.g., a frequency generator (FG) signal or the like) supplied from the spindle motor 12 and the control signal supplied from the main controller 16.

For example, the disk rotation control unit 32 uses a so-called "constant linear velocity (CLV) method" to control the rotation of the optical disk 2 so that the linear velocity of the optical disk 2 is constant.

The signal generator 14 includes a laser control unit 33, a main-data-signal generating unit 34, a servo-signal generating unit 35, and a wobble-signal generating unit 36. The laser control unit 33 controls the output of the optical beam (emitted onto the optical disk 2) from the optical pickup 11. For example, between the optical beam emitted onto the optical disk 2 and a different optical beam, which are output by a laser diode in the optical pickup 11, the different optical beam is received by a photo-receiving element in the laser control unit 33. The laser control unit 33 controls a driving current in the laser diode so that the optical beam from the laser diode is output at a constant level. In addition, for example, when data is written in the optical disk 2, the laser control unit 33 controls, based on the signal supplied from the signal processor 15, the output level of the optical beam from the optical pickup 11 to be adapted for data writing.

Based on the signal supplied from the optical pickup 11, the main-data-signal generating unit 34 generates the signal required for demodulating the data read from the optical disk 2, such as a radio frequency (RF) signal, and supplies the generated signal to the signal processor 15.

Based on the signal supplied from the optical pickup 11, the servo-signal generating unit 35 generates the signal required for controlling the optical pickup 11, such as a servo-error signal, and supplies the generated signal to the signal processor 15 and the main controller 16.

Based on the signal supplied from the optical pickup 11, the wobble-signal generating unit 36 generates a wobble signal corresponding to wobbles of grooves and lands of the optical disk 2, and supplies the wobble signal to the signal processor 15 and the main controller 16.

Figure 2:
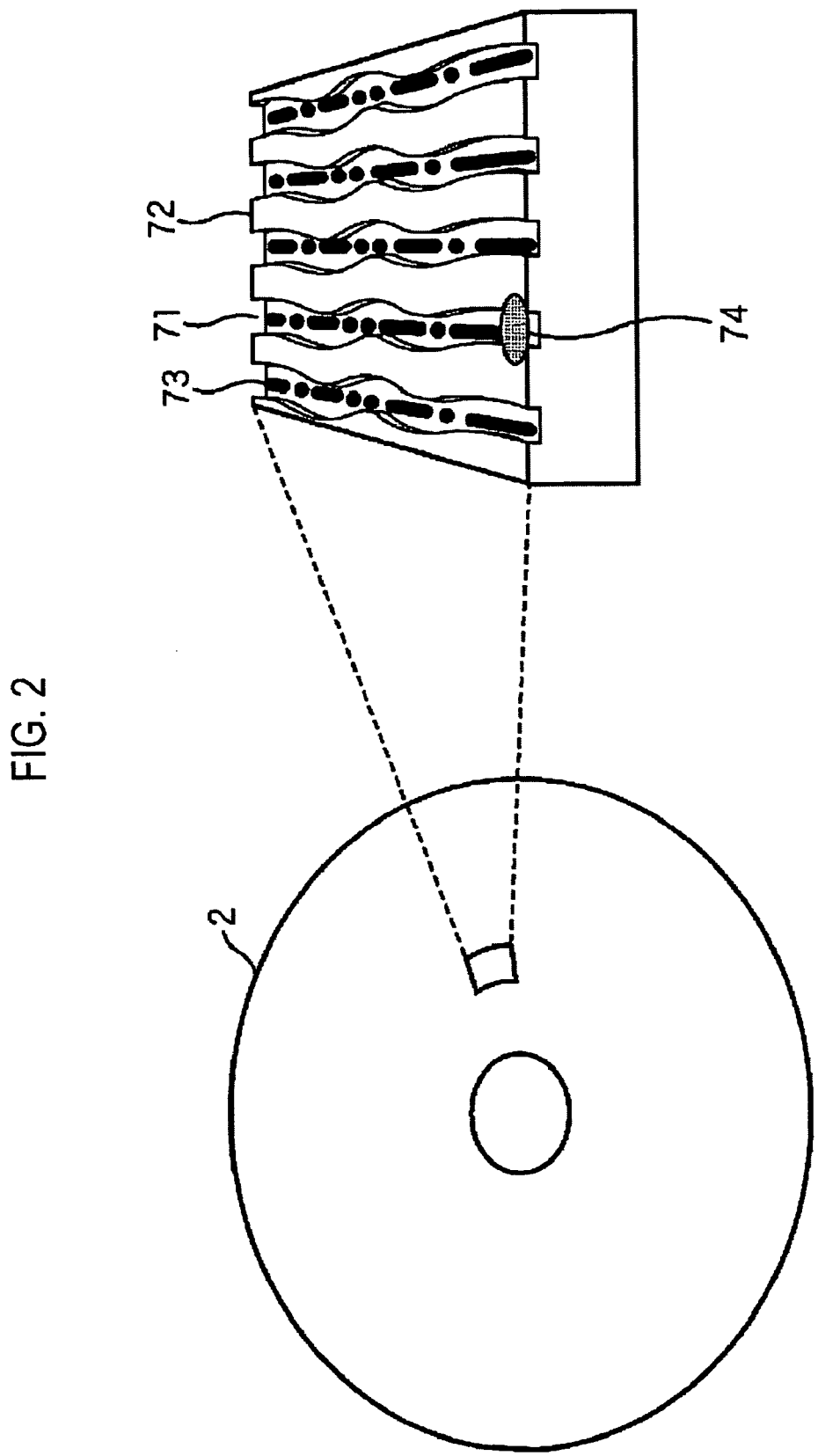
FIG. 2 is an illustration of wobbling grooves and lands of an optical disk.

FIG. 2 illustrates the wobbling grooves and lands of the optical disk 2. As shown in FIG. 2, each groove 71 and each land 72 of the optical disk 2 are formed of, for example, a base and recording layer of the optical disk 2. The groove 71 and land 72 of the optical disk 2 wobble on a cycle based on the specifications of the format of the optical disk 2.

Pits 73 corresponding to the data recorded on the optical disk 2 are formed, for example, in the groove 71 of the optical disk 2 by the optical-disk recording/playback apparatus 1. The optical beam emitted from the optical pickup 11 forms a spot 74 on the optical disk 2. Light reflected by the spot 74 is detected by the optical pickup 11, and the optical pickup 11 outputs a signal having a level corresponding to the intensity of the reflected light from the spot 74.

Specifically, the signal supplied from the optical pickup 11 to the signal generator 14 includes components whose intensities are changed by the pits 73, and components whose intensity is changed by the wobbling groove 71 and land 72.

For example, the main-data-signal generating unit 34 extracts, from the signal supplied from the optical pickup 11, the components whose intensities are changed by the pits 73, and outputs the extracted components as an RF signal. For example, the wobble-signal generating unit 36 extracts, from the signal supplied from the optical pickup 11, the components whose intensities are changed by the wobbling groove 71 and land 72, and outputs the extracted components as a wobble signal. More specifically, the wobble-signal generating unit 36 uses bandpass filtering on the signal supplied from the optical pickup 11 to acquire a wobble signal composed of predetermined frequency-range components.

The signal processor 15 includes a main-data demodulation unit 37, a main-data encoding unit 38, a servo-signal processing unit 39, and a wobble-signal processing unit 40. The main-data demodulation unit 37 plays back the data read from the optical disk 2 by demodulating the signal supplied from the signal generator 14. For example, the main-data demodulation unit 37 performs processing, such as eight-to-sixteen demodulation and error correction, on the RF signal supplied from the signal generator 14, and supplies the processed signal as data to the personal computer 3.

The main-data encoding unit 38 generates a signal to be recorded on the optical disk 2 by modulating the data supplied from the personal computer 3. For example, the main-data encoding unit 38 adds an error correcting code to the data supplied from the personal computer 3, and performs eight-to-sixteen modulation, or the like, on the error-corrected data. The resultant signal is supplied to the signal generator 14.

The servo-signal processing unit 39 processes a signal such as the servo-error signal supplied from the signal generator 14. For example, the servo-signal processing unit 39 executes digital servo processing based on the servo-error signal supplied from the signal generator 14.

The wobble-signal processing unit 40 processes the wobble signal supplied from the signal generator 14. For example, the wobble-signal processing unit 40 processes the wobble signal to generate time-code information, and supplies the supplied time-code information to the main controller 16.

The main controller 16 includes a pulse-interval measuring unit 41 and a control computer 42. The pulse-interval measuring unit 41 is formed by, for example, a digital signal processor or an embedded computer. The pulse-interval measuring unit 41 obtains a binarized wobble signal by binarizing the wobble signal composed of predetermined frequency-range components. The pulse-interval measuring unit 41 determines the period of the binarized wobble signal by measuring pulse intervals of the binarized wobble signal supplied from the signal processor 15.

The control computer 42 is formed by an embedded computer or the like. The control computer 42 controls each block of the optical-disk recording/playback apparatus 1 by executing a control program stored in a built-in memory of the embedded computer.

The control computer 42 may execute the process of obtaining the binarized wobble signal by binarizing the wobble signal and the process of determining the period of the binarized wobble signal. A case in which the control computer 42 executes the process of obtaining the binarized wobble signal and the process of determining the period of the binarized wobble signal is described below.

A drive 4 is connected to the personal computer 3, if needed. A magnetic disk 5, an optical disk 6, a magneto-optical disk 7, or a semiconductor memory 8 is loaded into the drive 4. The drive 4 reads a program recorded on the magnetic disk 5, the optical disk 6, the magneto-optical disk 7, or the semiconductor memory 8, and supplies the program to the personal computer 3. The personal computer 3 supplies the read program to the control computer 42 in the main controller 16 through the signal processor 15. The control computer 42 in the main controller 16 executes the supplied program, if needed.

As described above, the control computer 42 can execute the program recorded on the magnetic disk 5, the optical disk 6, the magneto-optical disk 7, or the semiconductor memory 8.

Figure 3:
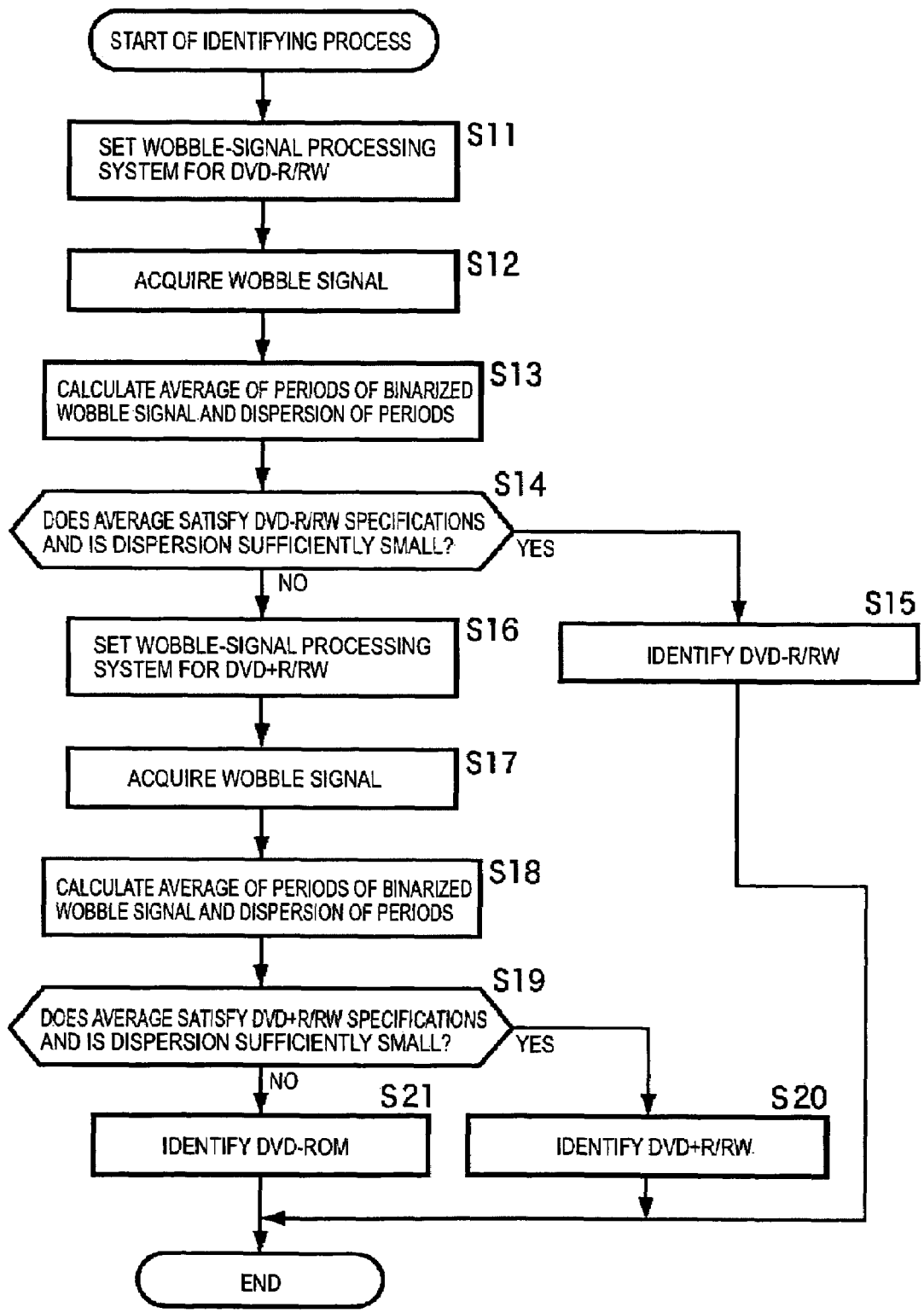
FIG. 3 is a flowchart illustrating an optical disk identifying process.

Next, a process of identifying the optical disk 2 which is executed by the control computer 42 (for executing the control program) when the optical disk 2 is loaded into the optical-disk recording/playback apparatus 1 is described below with reference to the flowchart shown in FIG. 3.

In step S11, the control program sets a wobble signal processing system for a DVD-R and DVD-RW. For example, in step S11, the control program sets, in the wobble-signal generating unit 36, a bandpass-filter frequency range adapted for allowing a wobble signal from the DVD-R and DVD-RW to pass through the bandpass filter.

The wobble signal from the DVD-R and DVD-RW, and a wobble signal of a DVD+R and a DVD+RW are described below.

According to DVD-R and DVD-RW specifications, a wobble signal period is equal to the period represented by 186 channel bits and a wobble signal frequency is 140 kHz. In addition, according to DVD+R and DVD+RW specifications, a wobble signal period is equal to the period represented by 32 channel bits and a wobble signal frequency is 817 kHz.

In other words, between each of DVD-R and DVD-RW and each of DVD+R and DVD+RW, both have equal recording sizes per disk, equal numbers of channel bits for two synchronizing frames, that is, 2976 channel bits. Thus, when both have the same linear velocity, the wobble signal frequency is determined by a wobble signal period for channel bits.

For example, in step S11, the control program sets the bandpass-filter frequency range of the wobble-signal generating unit 36 to a value adapted for allowing the wobble signal from the DVD-R and DVD-RW, which has a lower frequency range of 140 kHz, to pass through the bandpass filter, compared with the wobble signal from the DVD+R and DVD+RW, which has a frequency range of 817 kHz. More specifically, by setting the central value of the pass-band to 140 kHz, and setting a high-range cutoff frequency to 280 kHz, the control program sets up the bandpass filter of the wobble-signal generating unit 36 so that a frequency component of 140 kHz may pass through the bandpass filter and a frequency component of 817 kHz may not pass through the bandpass filter.

In step S12, the control program acquires a wobble signal. For example, in step S12, the control program acquires the wobble signal supplied from the wobble-signal generating unit 36. The control program generates and acquires a binarized wobble signal by binarizing the wobble signal, which includes predetermined frequency-range signal components.

In step S13, the control program calculates the average period of the binarized wobble signal and the variance of the period of the binarized wobble signal. For example, in step S13, the control program calculates the average period $T_{ave}$ of the binarized wobble signal based on the following expression:

$$T_{ave} = \frac{1}{N}\sum_{k=1}^{N} T_k \qquad (1)$$

where N represents the number of sampled periods, and $T_k$ represents a period extracted from the binarized wobble signal.

For example, in step S13, the control program calculates the variance $\sigma^2$ of the period of the binarized wobble signal based on the following expression:

$$\sigma^2 = \frac{1}{N}\sum_{k=1}^{N}(T_k - T_{ave})^2 \qquad (2)$$

where, similarly to the case of Expression (1), N represents the number of sampled periods period $T_k$ represents a period extracted from the binarized wobble signal, and $T_{ave}$ represents the average period of the binarized wobble signal.

The wobble signal is described below.

The wobble signal is sinusoidal waves corresponding to the wobbling of the groove 71 of the optical disk 2. The wobble signal can be obtained only in the case of performing signal processing adapted for the format (specifications) of the optical disk 2 when it is loaded into the optical-disk recording/playback apparatus 1. In the case of performing signal processing adapted for a different format, the wobble signal which is sinusoidal waves corresponding to the wobbling of the groove 71 of the optical disk 2 cannot be obtained.

Figure 4:
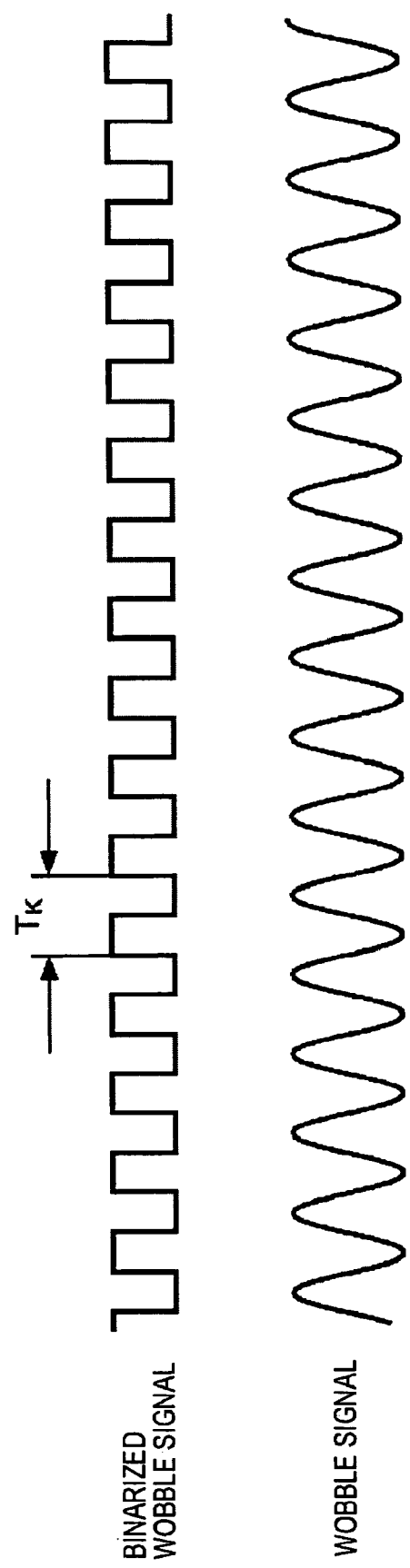
FIG. 4 is an illustration of examples of a binarized wobble signal and a wobble signal.

FIG. 4 shows examples of the wobble signal and binarized wobble signal obtained in step S12 when a DVD-R or DVD-RW is loaded as the optical disk 2.

When the optical disk 2 is loaded, the wobble-signal generating unit 36 is supplied with a wobble signal formed by 140-kHz sinusoidal waves corresponding to the groove 71, which wobbles sinusoidally.

In step S11, the frequency range of the bandpass filter of the wobble-signal generating unit 36 is set to a value adapted for allowing a 140-kHz signal to pass through the bandpass filter. Thus, the bandpass filter of the wobble-signal generating unit 36 allows signal components formed by the 140-kHz sinusoidal waves (in the wobble signal) to pass through it, and blocks, for a cutoff frequency, lower frequency components and higher frequency components.

As a result, the sinusoidal wobble signal shown in FIG. 4 is obtained. Binarization of this sinusoidal wobble signal produces a binarized wobble signal formed by a train of pulses having approximately equal periods.

In this case, in step S13, a value (value corresponding to 140 kHz) corresponding to the groove 71 of the optical disk 2, which is a DVD-R or DVD-RW, is obtained as the average period $T_{ave}$ of the binarized wobble signal. In addition, since the binarized wobble signal has approximately constant periods, in step S13, extremely small variance $\sigma^2$ is obtained.

When a DVD+R or DVD+RW is loaded as the optical disk 2, the wobble-signal generating unit 36 is supplied with a signal including signal components formed by sinusoidal waves having 817 kHz, which is a frequency higher than that of the wobble signal obtained when the DVD-R or DVD-RW is loaded as the optical disk 2.

In step S11, the frequency range of the bandpass filter of the wobble-signal generating unit 36 is set to a value adapted for allowing the wobble signal from the DVD-R or DVD-RW, that is, the above frequency range is set so that a frequency component of 140 kHz may pass through the bandpass filter and a frequency component of 817 kHz may not pass through the bandpass filter. Thus, the components of the wobble signal which correspond to the sinusoidally wobbling groove 71 of the DVD+R or DVD+RW used as the optical disk 2 are blocked by the bandpass filter of the wobble-signal generating unit 36. In other words, as shown in FIG. 5, the sinusoidal components corresponding to the wobbling of the groove 71 are eliminated from the wobble signal, and the component-eliminated wobble signal is binarized.

The pulse periods of the binarized wobble signal vary.

In this case, in step S13, a value different from the value corresponding to the groove 71 of the DVD-R or DVD-RW used as the optical disk 2 is obtained as the average period $T_{ave}$ of the binarized wobble signal. In addition, due to variation in period of the binarized wobble signal, large variance $\sigma^2$ is obtained in step S13.

When a DVD-ROM is loaded as the optical disk 2, a wobble signal including sinusoidal components cannot be obtained since the DVD-ROM does not have any sinusoidally wobbling grooves. Also in this case, pulse periods of the binarized wobble signal vary.

Therefore, also when the DVD-ROM is loaded as the optical disk 2, in step S13, the average period $T_{ave}$ of the binarized wobble signal, which does not meet the specifications of the DVD-R or DVD-RW format, is calculated, thus, large variance $\sigma^2$ is calculated.

In step S14, the control program determines whether the average period $T_{ave}$ of the binarized wobble signal satisfies the DVD-R or DVD-RW specifications, and determines whether the variance $\sigma^2$ of the period of the binarized wobble signal is sufficiently small. If the control program has determined that the average period $T_{ave}$ of the binarized wobble signal satisfies the DVD-R or DVD-RW specifications and has determined that the variance $\sigma^2$ of the period of the binarized wobble signal is sufficiently small, the control program proceeds to step S15. In step S15, the control program identifies the loaded optical disk 2 as the DVD-R or DVD-RW, and the control program ends.

In other words, in step S14, based on the average period $T_{ave}$ of the binarized wobble signal and the variance $\sigma^2$ of the period of the binarized wobble signal, the control program determines which of the DVD-R and DVD-RW formats the optical disk 2 has.

For example, in step S14, the control program determines whether the average period $T_{ave}$ of the binarized wobble signal satisfies the DVD-R or DVD-RW specifications by comparing the average period $T_{ave}$ of the binarized wobble signal which is calculated in step S13 with each of two threshold values stored beforehand which respectively represent upper and lower limits. In addition, the control program determines whether the variance $\sigma^2$ of the period of the binarized wobble signal is sufficiently small by comparing the variance $\sigma^2$ of the period of the binarized wobble signal with a threshold value stored beforehand (different from the upper and lower limits).

In step S14, if the control program has determined that whether the average period $T_{ave}$ of the binarized wobble signal does not satisfy the DVD-R or DVD-RW specifications, and or has determined that the variance $\sigma^2$ of the period of the binarized wobble signal is not sufficiently small, the loaded optical disk 2 is not a DVD-R or DVD-RW. Accordingly, the control program proceeds to step S16 and sets the wobble signal processing system for the DVD+R and DVD+RW.

For example, in step S16, the control program sets the frequency range of the bandpass filter of the wobble-signal processing unit 40 to a value adapted for allowing the DVD+R and DVD+RW wobble signal, which has a higher frequency of 817 kHz compared with the DVD-R and DVD-RW wobble signal, which has a frequency of 140 kHz, to pass through the bandpass filter. More specifically, for example, by setting the central value of the passband to 817 kHz so that the low range cutoff frequency is set to approximately 400 kHz, the control program sets up the bandpass filter of the wobble-signal generating unit 36 so that a frequency component of 817 kHz may pass through the bandpass filter and a frequency component of 140 kHz may not pass through the bandpass filter.

In step S17, the control program acquires the wobble signal. For example, in step S17, the control program acquires the wobble signal acquired from the wobble-signal generating unit 36 by performing processing similar to that in step S12. The control program generates a binarized wobble signal by binarizing the wobble signal, which includes components of a signal having a predetermined frequency range.

In step S18, the control program calculates the average period $T_{ave}$ of the binarized wobble signal and the variance $\sigma^2$ of the period of the binarized wobble signal by performing processing similar to that in step S13.

In step S19, the control program determines whether the average period $T_{ave}$ of the binarized wobble signal satisfies the DVD+R or DVD+RW specifications, and determines whether the variance $\sigma^2$ of the period of the binarized wobble signal is sufficiently small. If the control program has determined that the average period $T_{ave}$ of the binarized wobble signal satisfies the DVD+R or DVD+RW specifications and has determined that the variance $\sigma^2$ of the period of the binarized wobble signal is sufficiently small, the control program proceeds to step S20. In step S20, the control program identifies the loaded optical disk 2 as the DVD+R or DVD+RW, and the control program ends.

In other words, in step S19, based on the average period $T_{ave}$ of the binarized wobble signal and the variance $\sigma^2$ of the period of the binarized wobble signal, the control program determines which of the DVD+R and DVD+RW formats the optical disk 2 has.

For example, in step S19, the control program determines whether the average period $T_{ave}$ of the binarized wobble signal satisfies the DVD+R or DVD+RW specifications by comparing the average period $T_{ave}$ of the binarized wobble signal which is calculated in step S18 with each of two threshold values (different from the threshold values in step S14) stored beforehand which respectively represent upper and lower limits. In addition, the control program determines whether the variance $\sigma^2$ of the period of the binarized wobble signal is sufficiently small by comparing the variance $\sigma^2$ of the period of the binarized wobble signal with a threshold value stored beforehand (different from the upper and lower limits).

In step S19, if the control program has determined that the average period $T_{ave}$ of the binarized wobble signal does not satisfy the DVD+R or DVD+RW specifications, and or has determined that the variance $\sigma^2$ of the period of the binarized wobble signal is not sufficiently small, the loaded optical disk 2 is not a DVD+R or DVD+RW. Accordingly, the control program proceeds to step S21 and identifies the loaded optical disk 2 as a DVD-ROM, and the control program ends.

As described above, the optical-disk recording/playback apparatus 1 can determine which of the DVD-ROM, DVD-R/RW, and DVD+R/RW, the loaded optical disk 2 is.

In the case of identifying an optical disk format by only using periods of a binarized wobble signal, periods of a binarized wobble signal based on an optical disk format happen to coincide with those of a binarized wobble signal based on a different optical disk format. Actually, the optical-disk recording/playback apparatus 1 may mistakenly identify an optical disk format.

However, as described above, by identifying an optical disk format on the basis of periods and variance of a binarized wobble signal, the optical-disk recording/playback apparatus 1 is prevented from mistakenly identifying an optical disk format.

As described above, the wobble signal has a relatively low frequency of approximately 817 kHz or 140 kHz, so that a dedicated device does not need to be provided. In the control computer 42 formed by the embedded computer or the like, which has relatively low performance, by using a built-in timer function, a wobble signal is acquired and the average period of the wobble signal and the variance of the period of the wobble signal can be calculated. As a result, the cost required for adding functions can be suppressed.

As described above, in the case of acquiring the wobble signal, an optical disk format can be identified based on the wobble signal. In addition, in the case of acquiring a wobble signal, calculating the average period of the wobble signal and the variance of the period of the wobble signal, and identifying a predetermined optical disk format based on the calculated average period and variance, it is ensured that the optical disk format can be identified without additionally providing a special device for identifying the optical disk.

The optical disk 2 is not limited to DVD-R/RW and DVD+R/RW, but may be an optical disk other than DVD if a wobble signal can be detected from it.

The above-described consecutive processing can be executed either by hardware or by software. In the case of using software to execute the above-described consecutive processing, programs forming the software are installed from a recording medium or the like into a computer built-in dedicated hardware, or, for example, a personal computer in which various functions can be executed by installing various programs.

As shown in FIG. 1, this recording medium is formed by the magnetic disk 5, the magneto-optical disk 7 (Mini-Disc®), or package media formed by the semiconductor memory 8 or the like, which contains a program, which is distributed, separately from the computer, for providing the program to the user. In addition, the recording medium is formed by a program-recorded ROM (not shown) or hard disk (not shown) which is provided to the user in a state built into the computer.

Programs for allowing a computer to execute the consecutive processing may be installed into the computer through an interface, such as a router and a modem, and through a wired or wireless communication medium such as a local area network, the Internet, or a digital satellite broadcasting.

Moreover, in this specification, steps describing programs recorded on a recording medium include processing steps performed on the given order in time-series manner, and processing steps executed in parallel or separately if these processes are not always performed in time-series manner.

What is claimed is:

1. An optical disk driving apparatus for driving an optical disk, the apparatus comprising:
   acquiring means for acquiring a periodic wobble signal;
   calculating means for calculating an average period of the wobble signal and a variance of the period of the wobble signal; and
   determining means for determining, based on a calculated average period and the variance of the period of the wobble signal calculated by the calculating means, whether the optical disk is of a predetermined format.

2. An optical disk driving method for an optical disk driving apparatus for driving an optical disk, said optical disk driving method comprising:

an acquiring step of acquiring a periodic wobble signal;

a calculating step of calculating an average period of the wobble signal and a variance of the period of the wobble signal; and a determining step of determining, based on a calculated average period and the variance of the period of the wobble signal calculated in the calculating step, whether the optical disk is of a predetermined format.

3. A recording medium having a computer-readable program recorded thereon, the program controlling an optical disk driving apparatus for driving an optical disk, the program comprising:

an acquiring step of acquiring a periodic wobble signal;

a calculating step of calculating an average period of the wobble signal and a variance of the period of the wobble signal; and a determining step of determining, based on a calculated average period and the variance of the period of the wobble signal calculated in the calculating step, whether the optical disk is of a predetermined format.

4. A program for allowing a computer to perform a process of controlling an optical disk driving apparatus for driving an optical disk, said program comprising:

an acquiring step of acquiring a periodic wobble signal;

a calculating step of calculating a average period of the wobble signal and a variance of the period of the wobble signal; and a determining step of determining, based on a calculated average period and the variance of the period of the wobble signal calculated in the calculating step, whether the optical disk is of a predetermined format.

* * * * *